L. M. BATTY.
Mower.
No. 3,406. Reissued April 27, 1869.
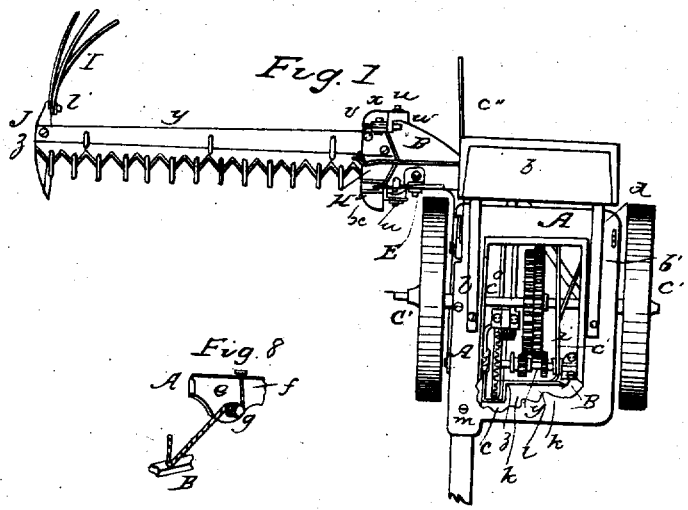
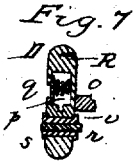
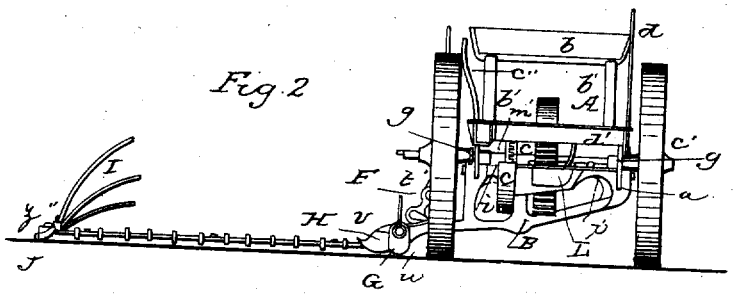
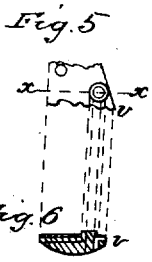
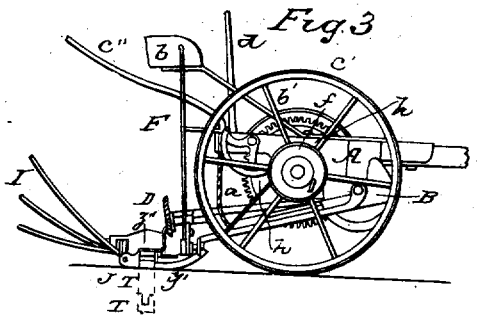
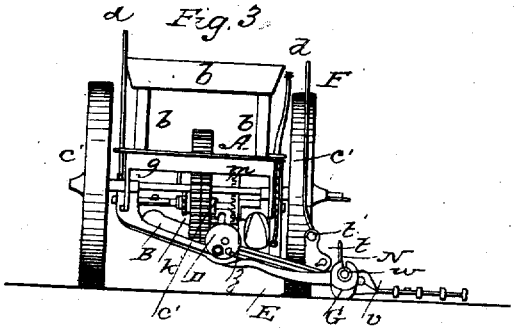
Witnesses
W. H. Burridge
J. Holmes
Inventor
L. M. Batty
N. PETERS, Photo-Lithographer, Washington, D. C.

UNITED STATES PATENT OFFICE.

M. G. HUBBARD, OF SYRACUSE, NEW YORK, ASSIGNEE OF L. M. BATTY.

IMPROVEMENT IN HARVESTERS.

Specification forming part of Letters Patent No. 49,962, dated September 19, 1865; Reissue No. 3,406, dated April 27, 1869.

*To all whom it may concern:*

Be it known that L. M. BATTY, of Canton, in the county of Stark and State of Ohio, did invent certain new and useful Improvements in Harvesters, of which the following is a full, clear, and exact description, reference being had to the accompanying drawing, making a part of this specification, in which—

Figure 1 is a top view of the machine. Fig. 2 is a front elevation. Fig. 3 is a side elevation. Fig. 4 is a rear elevation; and Figs. 5, 6, 7, and 8 are sectional views, that will be referred to in the description.

Similar letters of reference denote corresponding parts in all the figures.

A represents the main cast frame, hung to the driving-shaft C of the wheel C′ by two tubular boxes, *g g*, (shown in Figs. 2 and 4,) on the shaft driven through holes in pieces extending down from the frame A, which is mounted on two driving-wheels ratcheted to the main shaft in the ordinary manner. B is a flexible frame or arm formed of a single casting, having a concave bar across the front end for the purpose of adding strength to it, and of forming boxes *i i* for the shaft *z* and to protect the shaft and the changeable-speed and bevel-cog wheels on it from injury. There is also a bar, *c*, running at right angles to this under the crank-shaft *o* and cog-wheel *n* for the same purpose. The flexible frame or arm B supports the crank-shaft, and is hung to the main frame A at a point concentric with the shaft *z*, around which it vibrates and which supports the bevel-wheel.

The frame or arm B may be partly supported by a coiled spring, *e*, (shown in Figs. 3 and 8,) which is on one of the tubular boxes *g* of the driving-shaft, and is connected with the flexible frame or arm B by passing through a loop-hole, as represented in Fig. 8. The tension of this spring is regulated by a set-screw, *f*. The object of the spring *e* is to regulate the balance of the machine and to throw a larger portion of the weight of the frame or arm B upon the driving-wheels.

About the center of the driving-shaft are two spur-cog rims, *h*, with two concentric circles of cogs of different diameters, upon which the two driving-wheels act, and which, together with the sliding pinions *k* and *k′*, can be made to impart two different speeds to the sickle through the medium of the hand-lever *d*, the intermediate lever *d′*, and the sliding shifter L, or any other usual and convenient shifting arrangement. The shifter is connected to the pinions by clutches that fit in grooves in the hubs *c′* of the pinion. Both pinions are thrown out of gear by placing the hand-lever *d* erect in its central position.

The pinion *k* is thrown in gear by moving the hand-lever over to the rear end of the machine, and the pinion *k′* is put in gear by throwing the hand-lever over to the front of the machine, thereby connecting either pinion with the double clutch *l* on the shaft *z*.

The inner end of the crank-shaft *o* is fitted to a conical hole in the pinion *p*, (shown in Fig. 1,) which, together with the nut and washer to secure the pinion on the end of the shaft, forms a friction-clutch for the purpose of preventing the sickle from being broken when it meets an obstruction.

D is the crank-wheel, a vertical section of which, enlarged, is shown in Fig. 7. It has an oil-cavity, P, the orifice *q* of which is closed by means of the valve-plate and spring R, the spring bearing against the back surface of the oil-cavity. The plate can be pressed back by the point of an oil-can, or otherwise when it is desired to fill the cavity. From the oil-cavity to the pitman-journal U there is a small hole, S, through which the oil flows to lubricate the bearings.

The journal U of the pitman *r* consists of a tube having a flange extending out around the inner end of it. The upper end of the pitman is bent at right angles and driven tightly through the tube and fastened to it by a pin. The object of this is to get a larger bearing for the pitman-journal, which can be easily renewed when worn out. In using this lubricating device with the ordinary wrist of a crank or crank-wheel, the cavity will be placed in the center of the wrist, and will be made in a conical shape, with its apex at the back end, in order to preserve the full strength of the wrist.

The inner shoe, H, is attached to the frame B at its rear end by a swivel, *v*, which has a solid bearing within a socket in the rear extremity of the frame B, in which it is secured by a nut and washer, *w*. It is also secured to the shoe by a pin, $x'$, the whole being arranged so that the cutter-bar may be turned up backward and laterally. The shoe H is also attached at its front end to the frame B by the stay-rod E, having a swivel on its inner end, the same as the one described above, and is connected with the shoe by a pin, $x'$. This stay and rod may be fastened at any point of elevation to the upright guide N by tightening the set nut and bolt $u$. The whole is so arranged that the cutter-bar $y$ may be folded up, or the points of the cutter-guard set to any desired point of elevation or left unfastened to follow the ground by an independent motion, and thus adapted to mow all kinds of standing or lodged grass. $e'$ is the lifting-lever to raise the cutter-bar.

The adjustable runner G, Figs. 2 and 4, is made of sheet-steel, and so formed that it may be raised or lowered and set at any desired point of elevation by set-bolts $u$ $u$. The advantages of this over a spring-runner are, that its under surface may be kept level with the ground, and it can so readily be removed when not needed.

The stay-rod E is provided with a short pin, which enters a cam-hole, $t$, in the bottom of the cam-lever F, which is secured to the standard $t'$, which, being bolted to the frame B, can be removed when not needed. By working the cam-lever F laterally the driver can raise and lower the point of the cutter-guard while the machine is in motion. The principal advantage of this arrangement is that the cutter-guard may be thrown down to pick up patches of lodged grass without stopping the machine, and that it is not necessary to encumber the machine with the cam-lever and standard when they are not needed.

The outer shoe, J, is made of a solid casting above, or of a casting and wrought-iron plate extending lengthwise, and secured to the top of the cast part by rivets or screws. The outer end of the cutter-bar $y$ enters an opening, $z'$, in the shoe J, (shown in Fig. 3,) and the point of the cutter-guard enters a corresponding perpendicular slot in the front end of the shoe J. The cutter-bar can be raised or lowered in the shoe J by turning the set-screw $z''$ and inserting one or more blocks, T, over the end of the cutter-bar, and then tightening up the screw. The advantages of this shoe are the same as those before stated of the adjustable runner.

The track-clearer I is made of two pieces of steel or other elastic wire. The ends of the first piece are bent near enough to form the upper and under branches. The bent part forms a small semicircle, which is inserted in a circular slot in the inside of the heel of the shoe. The center or middle branch is of a separate piece of wire, and has a hole formed on its inner end, which is underlaid by a washer, there being through both a set screw or bolt, $l'$, by which the track-clearer is secured to the shoe at any desired point of elevation. The advantages of this track-clearer are that it is so simple of construction, very light, and, being so elastic, it is not easily broken.

Figs. 5 and 6 represent the manner of fastening the cutter-bar to the shoe H, which is done by elevating a portion of the cast shoe around the outer bolt-hole, forming a collar, V, about an inch and a half in diameter, and by having a corresponding hole in the extreme butt-end of the cutter-bar large enough to fit over it, and using a plate or washer under the nut or screw which holds the cutter-bar to the shoe at that point. The object of this improved mode of attaching the cutter-bar to the shoe is to obviate the ordinary method of cutting away a portion of the front edge of the butt-end of the cutter-bar to get a bearing against the cast-iron, and thereby materially weakening it.

What is herein claimed as the invention of L. M. BATTY is—

1. Locating on the cross-shaft which forms the center of the vertical movement of the cutting apparatus a bevel-wheel for driving the crank-shaft and a pair of spur-pinions of unequal size for varying its speed.

2. The combination, in a harvesting-machine, of two independent driving-wheels, two spur-gears of unequal size, and two corresponding pinions for changing the speed of vibrations of the cutters.

3. So hanging the cutting apparatus that its vertical vibration shall be around the center of two spur-pinions, which are so arranged as to vibrate the cutters with a changeable speed.

4. The combination of a main frame, two driving-wheels, two spur-gears of unequal size, and two corresponding pinions for varying the speed of the vibration of the cutters, with a cutting apparatus so attached with respect to the cross-shaft which carries the bevel-wheel that the vertical movement of said cutting apparatus shall be around said shaft as a center.

M. G. HUBBARD.

Witnesses:
HAM. W. BEARDSLEE,
C. W. SMITH.